United States Patent [19]

Boegli et al.

[11] Patent Number: 4,609,922
[45] Date of Patent: Sep. 2, 1986

[54] APPARATUS FOR CONTROLLING AND FOR SIGNAL TRANSMISSION IN CONVEYOR INSTALLATIONS

[75] Inventors: Peter Boegli, Studen; Ulrich Heiz, Säriswil, both of Switzerland

[73] Assignee: Inventio AG, Hergiswil, Switzerland

[21] Appl. No.: 544,787

[22] Filed: Oct. 24, 1983

[30] Foreign Application Priority Data

Oct. 26, 1982 [CH] Switzerland ............ 6227/82

[51] Int. Cl.[4] .............................................. G01S 13/80
[52] U.S. Cl. .............................. 343/6.8 R; 343/6.5 SS; 340/993
[58] Field of Search ......... 343/6.8 R, 6.5 LC, 6.5 SS; 340/991–994; 246/3, 4, 122 R

[56] References Cited

U.S. PATENT DOCUMENTS

| | | | |
|---|---|---|---|
| 2,393,291 | 1/1946 | Clark, Jr. ............... | 246/122 R X |
| 2,606,281 | 8/1952 | Thomas et al. .............. | 340/47 |
| 3,054,100 | 9/1962 | Jones ..................... | 246/122 R |
| 3,377,616 | 4/1968 | Auer, Jr. ................. | 246/122 R |
| 3,609,247 | 9/1971 | Halstead .................. | 246/8 |
| 4,040,053 | 8/1977 | Olsson ................... | 343/6.8 R X |
| 4,325,524 | 4/1982 | Krug .................... | 246/122 R |
| 4,339,753 | 7/1982 | Mawhinney ............... | 343/6.5 SS |

Primary Examiner—Thomas H. Tarcza
Assistant Examiner—Mark Hellner
Attorney, Agent, or Firm—Werner W. Kleeman

[57] ABSTRACT

Transponders are arranged at control locations associated with sections of a track or travel path. Each transponder is in wireless communication through an inductive transmission path and an optical transmission path with a conveyor present in the operable range of the transponder. Each transponder is in communication with a central system control via an associated group control unit by means of two-wire lines or conductors. The operational mode of each transponder is controllable by means of a multiplexer such that the transponder operates either as a responder or answering device with simultaneous unidirectional signal transfer and which responder is to be interrogated by a conveyor or as a bidirectional signal transmitter. The apparatus selectively functions as a location or site code transmitter and presence indicator for the individual conveyors or as bidirectional data transmitter with isolated directions between the conveyors and the central system control. Due to such dual utilization only one type of layout element is required, resulting in a high reduction in the installation expense and its maintenance. The apparatus is intended for the modular erection of conveyor installations of different sizes and output and is equally well suited for partially autonomous as well as for central control of the conveyors.

21 Claims, 4 Drawing Figures

Fig. 2a
Fig. 2b
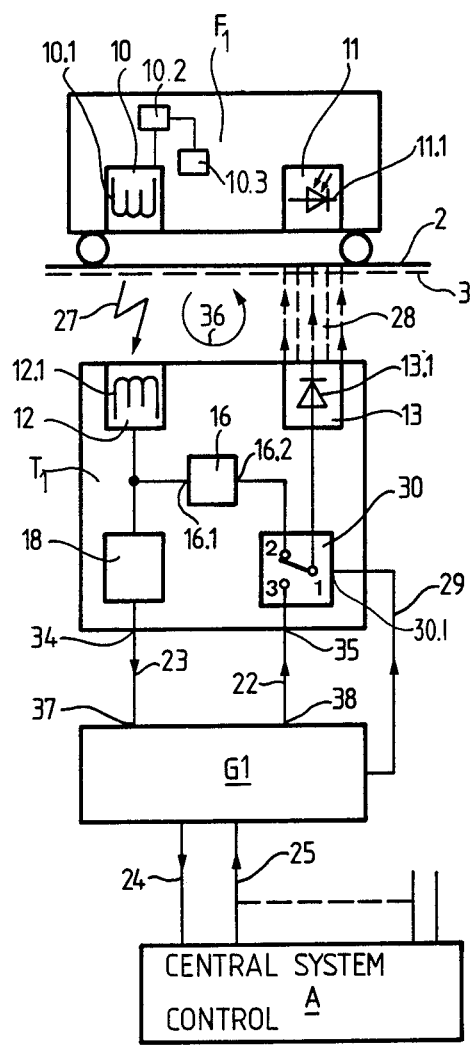
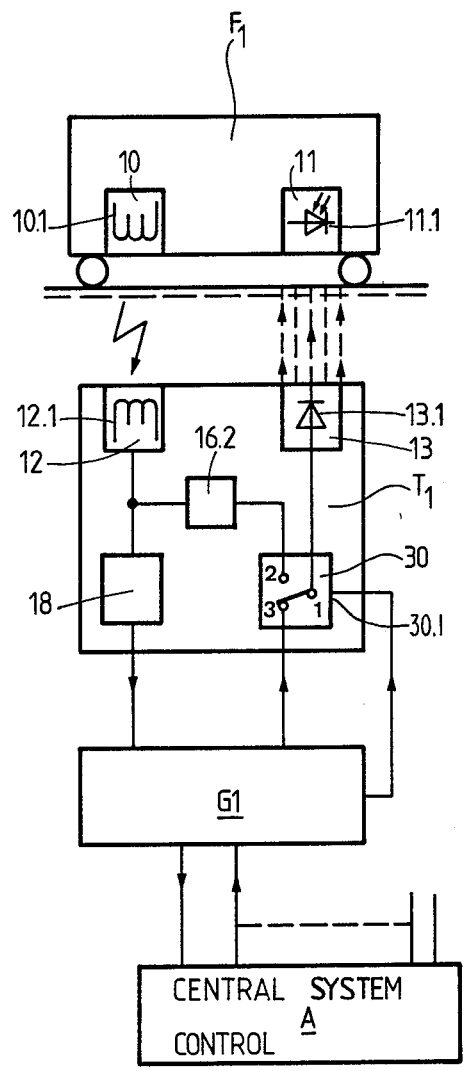

APPARATUS FOR CONTROLLING AND FOR SIGNAL TRANSMISSION IN CONVEYOR INSTALLATIONS

BACKGROUND OF THE INVENTION

The present invention relates to a new and improved apparatus for controlling and for signal transmission in conveyor installations or the like.

In its more specific aspects the invention relates to a new and improved apparatus for controlling and for signal transmission in conveyor installations or the like which is of the type including a number of conveyors movable along a track system or path of travel. Between the individual conveyors and a central system control there is provided a stationary transmitting and receiving installation, the receiving component or section of which comprises receiving circuits each of which is operatively associated with a respective track section and provided at a respective control location. Installations of such type are employed to control the movements of individual conveyors along their tracks or travel paths, for example, in floor-level conveyor installations and to transmit signals between the conveyors and a central system control or central control station.

A number of different types of such apparatus is already known which, in principle, rely upon functionally-specific layout elements which are arranged along the track or travel path and form an interface between the stationary control and the mobile conveyors. Exemplary of such equipment are control frequency loops to establish the track network, start-stop frequency loops for controlling the travel of the conveyors, presence detector loops for detecting the conveyors in their layout, floor sheet metal or metal plating arrangements for transmitting constant data to the conveyors. The start-stop loops and the presence detector loops are also used in pairs for bidirectional signal transmission between the conveyors and the stationary control by using frequency modulation. What is disadvantageous for such systems is the increased expense for the installation and the electronic components which results from the multitude of layout elements which are required. Additionally, the amount of data which can be encoded when using conventional floor metal plating arrangements is limited and frequently insufficient, for example, for identifying locations in installations working with an expansive track or travel path network.

An installation for the inductive signal transmission as known, for example, from European Patent Publication No. 0,053,599, is installed between a stationary transmitting and receiving station and individual conveyors. An induction loop laid along the track or travel path forms a transmission loop which is connected to the transmitting component or section of the transmitting and receiving station, while the receiving component or section comprises a number of receiving units for separate connection to reporting back loops, each of which is operatively associated with a respective track section.

For each of the two transmission directions there is thus required a special kind of layout element, i.e. a transmission loop and a reporting back loop. Furthermore, in such installations there is present the problem of cross-communication since the same frequencies are used for the transmission loop and for the reporting back loops. Therefore, to avoid expensive shielding the transmission loop and the reporting back loops must be arranged in planes extending perpendicular to each other, at least one of which contains the longitudinal axis of the loop associated with the other plane. Of course it is also necessary that the transmitting and receiving antennaes on the conveyors assume corresponding positions relative to each other and relative to the loops. There thus results a lack of freedom in the arrangement of the layout elements and the conveyors which constitutes a significant disadvantage. Also, the inductive signal transmission installation cannot de-centrally store and transmit constant data as required, for example, in partially autonomous operation by the conveyors for controlling their function and for determining their location within the layout. Therefore, all data required for the control of the conveyors has to be transmitted over the entire length of the transmission channels between the transmitting and receiving stations and the individual conveyors. In large-size installations of this type the limits of the available transmission capacity will be reached very soon notwithstanding the directional separation or isolation of the transmission channels.

In a system for identifying articles and persons and for data transmission as known, for example, from European Patent Publication No. 0,033,124, a reader is provided and a responder or answering device is arranged at the location of the data storage. The responder transmits reading signals arriving at the responder back to the reader with a time-delay corresponding to the data content. While such a system is specifically designed for data transfer which is safe from malfunction and falsification, this is ensured for only within the normal question-and-answer operation between the reader and the responder. While in this prior art system constant data like, for example, the location code in conveyor installations can be automatically transmitted and in a decentralized fashion to the conveyors, there is no possibility to interconnect the conveyors and the central system control with respect to the signals transmitted therebetween, as such is required when the conveyor installation is partially autonomously and centrally controlled.

SUMMARY OF THE INVENTION

Therefore, with the foregoing in mind it is a primary object of the present invention to provide a new and improved apparatus for controlling and for signal transmission in conveyor installations which is not afflicted with the aforementioned drawbacks and limitations of the prior art installations.

Another and more specific object of the present invention is directed to the provision of a new and improved apparatus for controlling and for signal transmission in conveyor installations which enables all functions required for the control of the individual conveyors to be accomplished by means of only one type of layout elements which are arranged along a track or travel path at predetermined control locations.

Still a further significant object of the present invention is directed to a new and improved construction of an apparatus for controlling and for signal transmission in conveyor installations which enables a bidirectional signal transfer between the individual conveyors and the stationary system control.

Another important object of the present invention is directed to a new and improved construction of an apparatus for controlling and for signal transmission in large-size or expansively laid-out conveyor installations containing a relatively large number of individual conveyors or the like.

Still another important object of the present invention is directed to a new and improved construction of an apparatus for controlling and for signal transmission in conveyor installations which is equally well suited for partially autonomous as well as for central control of the conveyors.

Now in order to implement these and still further objects of the invention, which will become more readily apparent as the description proceeds, the apparatus of the present development is manifested by the features that, a transponder is arranged at each control location or position and which is in wireless communication via transmission paths or links with a conveyor present within its operative or effective range and in two-wire communication with the central system control. The transponder can be selectively switched by means of a multiplexer controlled via a control line so as to function either as a responder or answering device which serves to simultaneously interrogate a conveyor and to transfer signals to the central system control or as a bidirectional signal transmitter between a conveyor and the central system control. For the operation as a responder or answering device with signal transmission the transponder comprises at least one code generator, a current amplifier as well as a transmitter for transmitting a response signal stored in the code generator to an individual conveyor. For bidirectional signal transfer or transmission the transponder comprises a demodulator, an output amplifier and an input amplifier.

A number of advantages achieved by the inventive apparatus result from the circumstance that only one type or kind of layout element, namely the transponder or pulse repeater, is required to perform the necessary control function and the bidirectional signal transmission in the conveyor installation. As a result thereof, firstly, the expense with respect to installation, maintenance and storage of spare parts is greatly reduced. Of particular significance, however, is the possibility of delegating to the peripheral transponders certain control functions as, for example, the storage of the site or location code and other constant data as well as the transfer thereof to the conveyors from the system control or from group control units. In this manner the same system configuration can be selectively used either for centrally controlled or partially autonomous operation. It is only necessary to store the requisite data in the code generators of the corresponding transponders.

The apparatus constructed and operated in accordance with the invention has the further advantage that the directions of signal transmission are isolated or separated and the wireless communication between the conveyor and the transponder is carried out inductively and opto-electronically. Due to such system design cross-communication or cross-talk is effectively precluded, so that in this regard no additional expensive and costly measures have to be undertaken. There also results therefrom an extensive freedom in the design of the layouts and in the relative arrangement of the inductive and opto-electronic transmitters and receivers at the conveyors and the transponders.

It has also proven to be particularly advantageous that, due to the use of the transponder or pulse repeater principle for storing and transmitting constant data there are eliminated the known restrictions with respect to the number of coding possibilities which exist in conventional floor plate arrangements. This has particular significance when the number of the required site or location identifications is relatively large as, for example, in a widely-branched or expansive track network containing numerous conveyors and track sections.

In addition to such capacity increase three important functions, namely the site or location identification in the layout, i.e. the site or location code, the detection of the conveyors in the layout, i.e. the presence indication, as well as the bidirectional signal transmission, can be combined in one system unit, namely the transponder, which heretofore was impossible. Furthermore, the contemplated Manchester code used in the receiver at the conveyor provides for a regeneration of the clock pulse frequency, so that the system can operate independently of frequency variations in the clock pulse generator of the transponder. Furthermore, this Manchester code reduces the current consumption of the code transmitter by about 50%.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 2a is a schematic block circuit diagram illustrating one operational mode of the transponder in the apparatus shown in FIG. 1, in which the transponder operates as a responder or answering device for unidirectional signal transmission or transfer in order to determine the location of the conveyors and to log their position in the layout at the stationary central system control of the apparatus shown in FIG. 1;

FIG. 2b is a schematic block diagram of a second mode of operation of the transponder in the apparatus shown in FIG. 1, in which the transponder operates as a bidirectional signal transmitter between the conveyors and the central system control of the apparatus shown in FIG. 1.

DETAILED DESCRIPTION OF THE PREFERRED EMBODIMENTS

Figure 1:
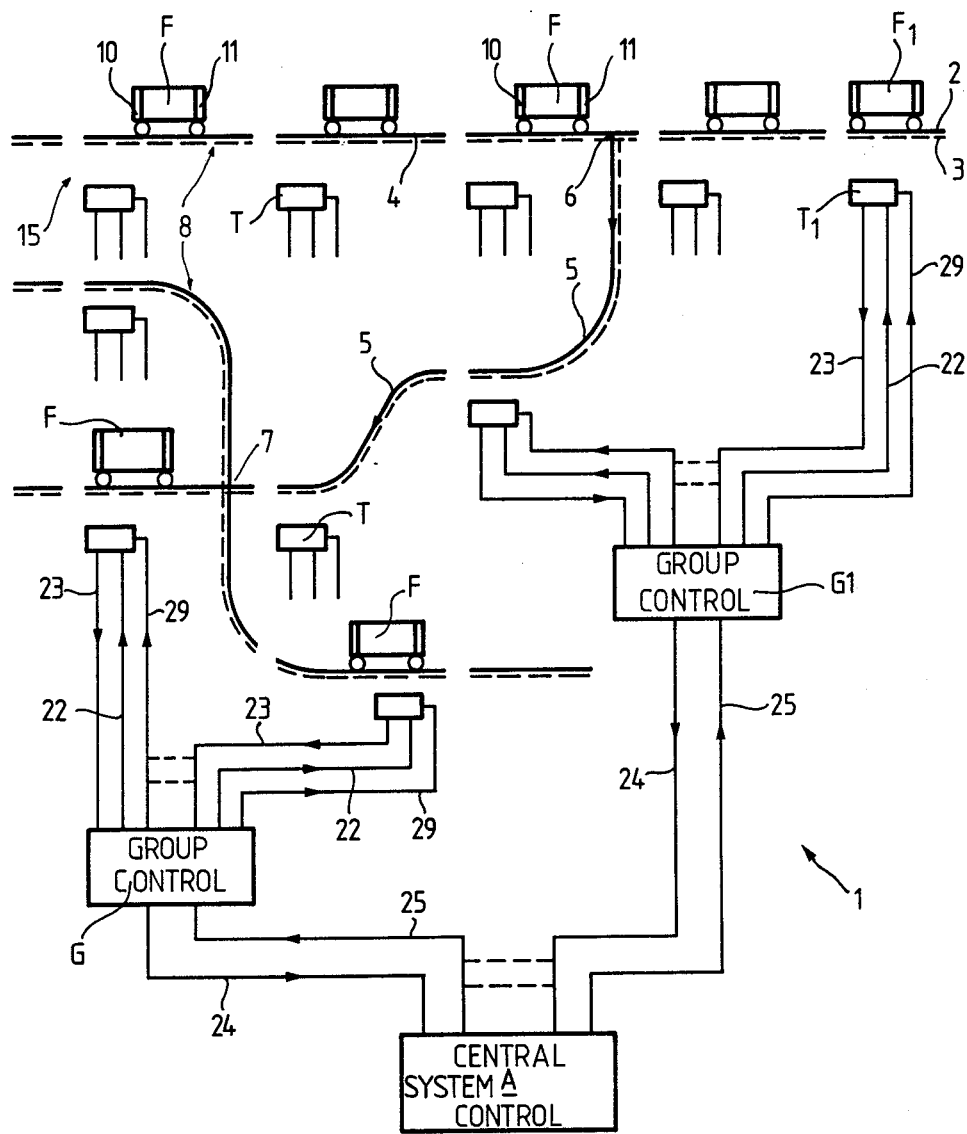
FIG. 1 is a diagramatic illustration of part of a conveyor installation or system containing the apparatus for controlling and for signal transmission according to the invention.

Describing now the drawings, it is to be understood that only enough of the construction of the apparatus has been shown as needed for those skilled in the art to readily understand the underlying principles and concepts of the present development, while simplifying the showing of the drawings. Turning attention now specifically to FIG. 1, there has been schematically and diagramatically illustrated therein a so-called track or travel path system comprising a number of conveyors F or equivalent structure which receive the material to be conveyed. The conveyors F are self-driven conveyor units movable along a trackless runway or path of travel 2 along a pilot track 3. Therefore, in the context of this disclosure the terms "track" or "track system" are used broadly and are not to be construed in a limiting sense as relating to only track-bound systems as such, rather generally encompass trackless or non-rail-bound systems. The track or travel network is subdivided in conventional manner to form track or travel path sections 8 which may comprise straight travel sections 4 and/or curved travel sections 5 and which may be singly or multiply branched, as generally indicated by reference characters 6 and 7 in FIG. 1. Track or travel path sections 8 may form a functional or spatial unit and with each track or travel section 8 there may be operatively associated a control location or position 15. As will be explained shortly, at each control location 15 there is provided a receiver of a stationary transmitting and receiving station which provides for signal transmission between the conveyors F and a central system control A. In particular, at each control location 15 there is placed a transponder T which are combined in groups, and each group of transponders T is connected to a common group control unit G. Each such travel path section 8 is freely selectable to operate in one of a number of different operational modes constituting a standard mode and an inspection mode for diagnosis and error detection. The intelligence for the operation of the conveyor installation is distributed to the central system control A, the group control units G and, to a lesser extent, the transponders T. Furthermore, the central system control or control means A is in signal communication with all conveyors F which are movable between the different control locations or positions 15 via the group control units G and the transponders T. The communicating connections or links are identically designed for all of the conveyors F. The specific design of such a communicating connection or link will be explained in greater detail hereinafter with reference to the conveyor F1 on the basis of the system configuration illustrated in FIG. 1.

Figure 3:
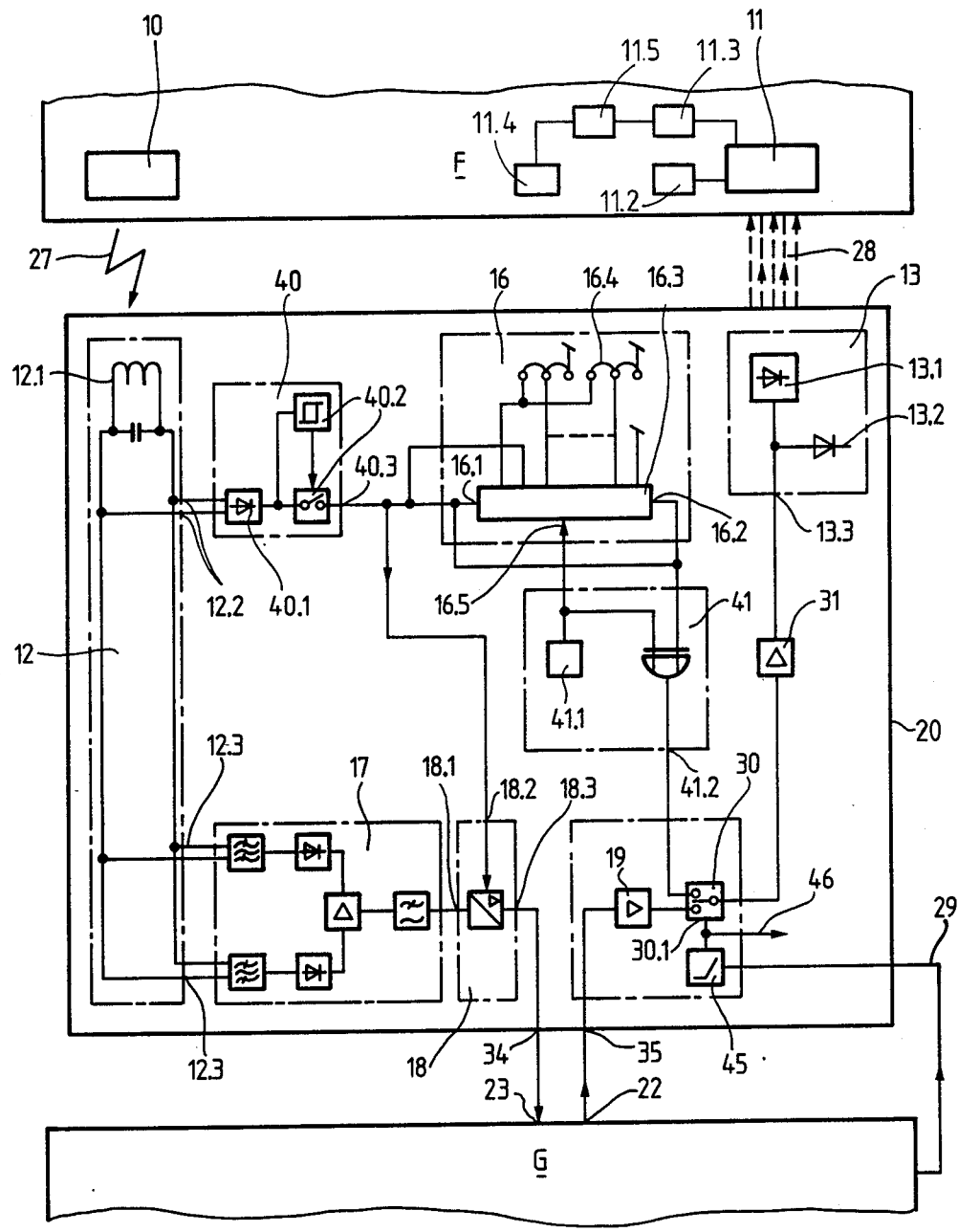
FIG. 3 is a schematic block circuit diagram of one possible construction of the transponder used in the apparatus shown in FIG. 1.

Transmitters 10 and 13 and receivers 11 and 12, respectively, are arranged at the conveyor $F_1$ and at the transponder $T_1$, respectively. The detailed structure thereof is shown in FIG. 3. As shown, the conveyor $F_1$ is located within the operative range of the transponder $T_1$. Consequently, transmission paths or links 27, 28 exist between the associated transmitters 10 and 13 and the receivers 11 and 12, respectively. The transponder $T_1$ and the conveyor $F_1$ are thus wirelessly and bidirectionally interconnected. This is indicated in detail in FIGS. 2a and 2b. As further shown in FIG. 1, two-wire lines or conductors 22 and 25 are provided between the transponder T1 and the group control unit G1 and between the latter and the central system control A in order to transmit, for example, control commands forming signal telegrams from the central system control A to the group control unit G1 and further to the related transponder $T_1$. The control commands are furthermore transmitted to the conveyor $F_1$ via the transmission path or link 28 (see FIG. 2a). In an analogous manner reporting back telegrams reach the central system control A when sent by the conveyor $F_1$. The transmitter 10 at the conveyor $F_1$ is therefore operatively connected to the receiver 12 at the transponder $T_1$ via the transmission path or link 27. The output 34 of the transponder $T_1$ is connected to the related group control unit G1 via a two-wire line or conductor 23 which communicates with the central system control A via a further two-wire line or conductor 24. A control line or conductor 29 leads from the group control unit G1 to the transponder $T_1$ and serves to select the operational mode of the transponder $T_1$ as well as the power supply to the transponder $T_1$ during bidirectional signal transmission. The circuit connections and function thereof will be explained in greater detail with reference to FIGS. 2a, 2b and 3 of the drawings.

FIG. 2a shows a transponder, such as the transponder $T_1$ when switched to function as a responder or answering device. The transmitter 10 at the conveyor $F_1$ contains a transmitting antenna 10.1 which is in communication with the receiving antenna 12.1 at the transponder $T_1$ via the inductive transmission path or link 27. A carrier wave is transmitted from the transmitting antenna 10.1 to the receiving antenna 12.1 and may be either unmodulated or modulated. In both cases the carrier wave also transmits electrical energy for the power supply of the transponder $T_1$ in addition to signals. The transponder $T_1$ is provided with a transmitter 13 comprising an infrared diode 13.1. In corresponding manner the conveyor $F_1$ is provided with a receiver 11 comprising a photosensitive diode 11.1. The transmitter 13 and the receiver 11 are in communication via an optical transmission path or link 28 for signal transmission in the reverse direction relative to the transmission path or link 27.

The transponder $T_1$ further comprises a code generator 16 which contains constant data like, for example, the site or location code, identifying codes for identifying individual conveyors F and the like. An input 16.1 of the code generator 16 is connected to the receiver 12 and an output 16.2 of the code generator 16 is connected to the transmitter 13 via a multiplexer 30. The circular arrow 36 illustrates the signal path corresponding to pure transponder operation of the transponder T, and which signal path is formed by an interrogation signal transmitted via the inductive transmission path or link 27 and by the response or answerback signal transmitted by the optical transmission path or link 28. An output amplifier 18 is provided and serves to control the two-wire line or conductor 23 interconnecting the output 34 of the transponder T and an input 37 of the group control unit G. The control line designated by reference character 29 is connected to a control input 30.1 at the multiplexer 30. As long as there is not carried any voltage by the control line 29 the multiplexer 30 assumes a first position in which the output 16.2 of the code generator 16 is connected to the transmitter 13 via the contacts 1-2 in the multiplexer 30. The group control unit G1 and the central system control A are bidirectionally interconnected via the two two-wire lines 24 and 25. As shown in FIG. 2a, the transponder $T_1$, due to the switching state of the multiplexer 30, is switched into a first operational state in which the transponder $T_1$ acts as a responder or answering device, in which the transponder $T_1$ is interrogated by interrogation signals transmitted from the conveyor $F_1$ through the transmission path or link 27 and responds thereto by transmitting response signals to the conveyor $F_1$ via the transmission path or link 28.

FIG. 2b shows the transponder $T_1$ of FIG. 2a in a second operational state. In this second operational state the channel through which signals are transferred from the conveyor $F_1$ to the central system control A is of the same design as in FIG. 2a. Contrary thereto, however, the control line 29 now carries voltage and consequently the multiplexer 30 is switched into a different state in which a connection is established between the contacts 1 and 3 thereof. Consequently, the interconnection between the output 16.2 of the code generator 16 and the transmitter 13 is broken and instead an input 35 of the transponder T is now connected to the transmitter 13 through the contact 1-3 of the multiplexer 30. There thus exists an additional transmission channel between the group control unit G and the conveyor $F_1$ which includes the multiplexer 30, the transmitter 13 and the optical transmission path or link 28.

FIG. 3 shows a detailed block circuit diagram of any one of the transponders T. In the actual case, the transponder T is accommodated in a housing 20 having, for instance, the dimensions 100×200×20 millimeters and thus can be easily installed without problems in the travel path or track 2. The receiving antenna 12.1 of the receiver 12 extends within the confines of the housing 20 and receives signals as well as electrical energy via the inductive transmission path or link 27. The receiver 12 has an energy output 12.2 to which there is connected an energy supply circuit 40 comprising a rectifier 40.1, a threshold switch 40.2 and an output 40.3 to supply the individual circuit components with voltage or power. Series connected thereto is, firstly, the code generator 16. This code generator 16 substantially comprises a shift register 16.3 designed as a parallel-to-series converter. The shift register 16.3 is externally programmable by means of programming inputs 16.4 and receives clock pulses via a control line 16.5. A coder 41 operating for instance according to the Manchester code is provided and possesses a clock pulse generator 41.1. An output 41.2 of the code generator 41 is connected to the contact 2 of the multiplexer 30, the contact 1 thereof is connected to a current amplifier 31 which supplies current to an input 13.3 of the transmitter 13. In the transmitter 13 there are present the infrared diode 13.1 as well as further connections 13.2 for connection to further infrared diodes.

A FSK-demodulator 17 (frequency-shift keying demodulator) is connected on the input side thereof to a data output 12.3 of the receiver 12 and on the output side thereof to input 18.1 of output amplifier 18. The output amplifier 18 comprises a further strobe input 18.2 which is connected to the output 40.3 of the energy supply 40. An output 18.3 of the output amplifier 18 leads to the output 34 of the transponder T, and thus, to the two-wire line 23 connecting the transponder T and the group control unit G. There thus exist two transmission channels from the conveyor F to the group control unit G between the receiving antenna 12.1 and the output 34 of the transponder T. A first transmission channel extends via the energy supply 40 and the strobe input 18.2 of the output amplifier 18 and serves, for example, for transmitting a presence indication signal which signifies the presence of a conveyor F within the operable range of the transponder T. A second transmission channel is formed by the FSK-demodulator 17 and the input 18.1 of the output amplifier 18 and serves for data transfer. In reverse direction there exists a third transmission channel between the input 35 of the transponder T and the infrared diode 13.1 which extends from the group control unit G to the conveyor F. This third transmission channel is also designed for data transfer and contains an input amplifier 19, the multiplexer 30 in a switching position in which there is a connection between the contacts 1 and 3 thereof, as well as the current amplifier 31.

Conjointly with the aforementioned second transmission channel for data transfer via the FSK-demodulator 17 there thus results a bidirectional data communication between the conveyor F and the group control unit G in which the data channels are isolated from each other with respect to direction. A further threshold switch 45 is provided between the control line 29 and the multiplexer 30. This threshold switch 45 is connected to the control input 30.1 of the multiplexer 30 and to a supply line 46 for current supply to the transponder T. The not here shown further elements provided at the conveyors F and in the group control units G are structured in such a manner as to be able to cooperate with the transponder T. To these elements there belong, at the conveyor F, the transmitter 10 for generating the electromagnetic field forming the inductive transmission path or link 27. The transmitting antenna 10.1 connected to the transmitter 10, a standard current source therefore, a fixed or FSK-modulatable oscillator 10.2 and a modulator 10.3 for possibly modulating the oscillator 10.2 in the FSK-mode, see FIG. 2a. There also belong to the elements on the conveyor F the photosensitive diode 11.1, a controlled pre-amplifier 11.2 therefore, a decoder 11.3 for the Manchester code and a bit-pulse regenerator 11.4 for clocking a data receiver 11.5. To the further elements in the group control unit G there belong a line drive and a line receiver which are matched to the transponder T, a further coder for the Manchester code, data transmitters and data receivers as well as a switchable source for positive supply voltage for connection to the control line 29.

In the following description the mode of operation of the inventive apparatus will be explained with reference to FIGS. 1, 2a, 2b and 3 and the explanation is based on functions which are typical for the operation of a conveyor installation or system.

In the absence of a voltage at the control line 29 for selecting the mode of operation of the transponder T, the multiplexer 30 and thus the transponder T is in a first operational state, and the contacts 1 and 2 in the multiplexer 30 are interconnected. The code generator 16 is accordingly connected to the input 13.3 of the transmitter 13 via the contacts 1 and 2 of the multiplexer 30. In this operational state the transponder T functions as a responder or answering device with simultaneous signal transmission from the conveyor F to the group control unit G which is located at the region of the transponder T. The unmodulated or modulated carrier wave which has a frequency in the kilohertz range, for this purpose induces sufficient voltage in the receiving antenna 12.1 to power the code generator 16 designed in accordance with CMOS-technology, the coder 41 for the Manchester code, the current amplifier 31 as well as the output amplifier 18. By means of the energy supply circuit 40 there is ensured that the current supply is only released when the current consumption can be safely met. In the code generator 16 containing the shift register 16.1 designed as a parallel-to-series converter, a stored eight-bit-word is converted in conventional manner into a serial asynchronous bit current or stream comprising a starting bit, a data byte, a parity bit and a stop bit. The parity bit serves in the usual way to ensure error detection. The Manchester coder 41 decreases the current consumption of the code generator 16 by about 50%, and furthermore enables a simple clock pulse regeneration in the receiver 11 located at the conveyor F. The thus prepared information or data is amplified by the current amplifier 31. Subsequently, the information or data is converted into infrared radiation pulses by the infrared diode 13.1 of the transmitter 13 and then transmitted in bits to the photosensitive diode 11.1 of the receiver 11 at the conveyor F via the optical transmission path or link 28.

In the code generator 16 constant data is stored for the control of the conveyor F. In the first place constituting part of the constant data is the site or location code which informs the conveyor F about its location within the layout. The conveyor F is thus able to appropriately change the state of its automatic mechanism. Thus, the transponder T functions as a responder or answering device which is electromagnetically activated and which optically transmits the code. The interrogation signal and the response or answerback signal are transmitted by electromagnetic induction and in the form of an infrared pulse telegram. Since the data stored in the code generator 16 primarily is the location code, in this operational state the transponder T fulfils as a first function that of a location code transmitter.

In addition to the aforementioned mode of operation, however, there is also the possibility of simultaneously transmitting with the generation of the site or location code, during a second function of the transponder T, signals which originate from a conveyor F to a group control unit G. In the embodiment of the apparatus which is used with the conveyor installation as previously described with reference to FIG. 1, such signals are mainly signals indicating the presence of the conveyor F and general data. The transmission of the presence indication is based on the recognition that only a transmitting antenna 10.1 at a conveyor F induces an electric voltage in the receiving antenna 12.1 at the transponder T. Since the transmitter 10 at the conveyor F is continuously operated, and thus, continuously emits the carrier frequency as long as the conveyor installation or system 1 is in operation, the energy supply circuit 40 always is supplied with voltage when a conveyor F is present within the operable range of a transponder T. The supply voltage at the output 40.3 of the energy supply circuit 40 thus not only energizes the code generator 16 but also provides an indicating signal representative of the presence of a conveyor F. However, the presence indicating signal will only then be further transmitted as a presence indication to the group control unit G if the carrier wave emitted by the conveyor F is unmodulated. It is particularly in this case that no data is present at the data input 18.1 of the output amplifier 18 in the transponder T, so that the voltage applied to the strobe input 18.2 passes to the output 34 of the transponder T. This voltage is transmitted as a presence indication to the group control unit G via the two-wire line 23. In this way an unmodulated carrier wave received from the conveyor F activates the code generator 16 and simultaneously transmits a presence indication to the group control unit G. Thus, the transponder T simultaneously functions as a location code transmitter and as a presence detector. During this operation of the transponder T the electrical energy required to power the transponder T, the interrogation signal and the presence indication signal are simultaneously transmitted in the form of an unmodulated carrier wave from the conveyor F to the transponder T via the inductive transmission path or link 27.

For transmission of data from the conveyor F to the group control unit G the transmitter 10 at the conveyor F transmits a modulated carrier wave which is emitted by its transmitting antenna 10.1 and received by the receiving antenna 12.1 of the receiver 12 at the transponder T. Contrary to the unmodulated carrier wave, now the modulated carrier wave appears at the data output 12.3 of the receiver 12 and thus is applied to the input side of the demodulator 17. In the demodulation 17 the data is demodulated and applied from the output side thereof to the data input 18.1 of the output amplifier 18 of the transponder T. In the output amplifier 18 data signals are now transmitted to the group control unit G instead of the presence indication signal. Thus, the code generator 16 is energized and at the same time data is transferred to the group control unit G when a modulated carrier wave is received by the receiving antenna 12.1 of the receiver 12 in the transponder T. In this case the transponder T simultaneously functions as a location code transmitter and as a unidirectional data transmitter. During this operation the electrical energy for powering the transponder T, the interrogation signal and the data are conjointly transferred in the form of a modulated carrier wave from the conveyor F to the transponder T via the inductive transmission path or link 27.

When the control line 29 carries voltage, the multiplexer 30 is switched so that now the contacts 1 and 3 are interconnected and the prior connection of the contacts 1 and 2 is interrupted. This provides for a selection of a second mode of operation of the transponder T which thus assumes a second operational state. In this second operational state the code generator 16 is isolated from the transmitter 13 due to the switching of the multiplexer to the described one-three contact connection. Now the transponder T can no longer function as a responder or answering device. However, the input 35 of the transponder T is now connected to the transmitter 13 via the contacts 1 and 3 of the multiplexer 30. Data now received from the group control unit G at the input 35 is amplified by the input amplifier 19 and by the current amplifier 31 with respect to voltage and current, respectively. By means of the series connected infrared diode 13.1 of the transmitter 13 this data is transformed into infrared radiation pulses for optical transmission to the conveyor F via the transmission path or link 28. Thus, there is present a unidirectional data channel from the group control unit G to the conveyor F via the two-wire line or conductor 22, the transponder T and the optical transmission path or link 28. Independently thereof there is present in the reverse direction the aforementioned data channel from the conveyor F to the group control unit G via the inductive transmission path or link 27, the demodulator 17 and the two-wire line or conductor 23. Since both channels can be activated either singly or in combination, each channel is advantageously provided with its own current supply. In particular, the first channel embodying the electromagnetic transmission path or link 27 is powered in known manner by the electromagnetic induction in the receiving antenna 12.1 of the receiver 12 and the second channel is powered via the line 46 by the control voltage applied to the multiplexer 30. In this second operational state, therefore, the inventive apparatus contains a bidirectional data channel with isolated transmission directions at each transponder T provided in the conveyor installation 1. The data channel connects the conveyors F and the associated group control units G. Diversity means can be provided for protecting signal transmission between the central system control A and individual ones of the conveyors F against malfunction and falsification.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An apparatus for controlling and for signal transmission in conveyor installations containing a number of conveyors movable along a track system constituted by a number of travel path sections, comprising:
   a central system control;
   a stationary transmitting and receiving installation containing a predetermined number of control locations and providing communication between individual ones of said conveyors and said central system control;
   said stationary transmitting and receiving installation comprising a number of transponders each arranged at a preselected one of said predetermined number of control locations;
   each said transponder being in wireless communicaton with a conveyor when the same is located within an operable range of said transponder and in two-wire communication with said central system control;
   said stationary transmitting and receiving installation comprising a number of multiplexers each operatively associated with a respective one of said transponders;
   each said transponder being selectively switchable by said multiplexer into either a first operational state in which said transponder simultaneously operates as a responder when interrogated by one of said conveyors present within the operable range thereof and as a transmitter for signal transmission to said central system control and a second operational state in which said transponder operates as a bidirectional transmitter between said one conveyor and said central system control;
   each said transponder, for operation in said first operational state, comprising at least one code generator, a current amplifier and a transmitter for transmitting to said one conveyor a response signal stored in said code generator; and
   each said transponder, for operation in said second operational state, comprising a demodulator, an output amplifier and an input amplifier.

2. The apparatus as defined in claim 1, further including:
   a number of group control units; and
   two-wire line means for operatively connecting each group control unit to a predetermined group of a selected number of said transponders and to said central system control.

3. The apparatus as defined in claim 1, wherein:
   each said conveyor is provided with a transmitting antenna;
   each said transponder is provided with a receiving antenna; and
   an interrogation signal being transmitted from said transmitting antenna to said receiving antenna by modulated electromagnetic induction.

4. The apparatus as defined in claim 1, wherein:
   each said conveyor is provided with a transmitting antenna;
   each said transponder is provided with a receiving antenna; and
   an interrogation signal being transmitted from said transmitting antenna to said receiving antenna by unmodulated electromagnetic induction.

5. The apparatus as defined in claim 1, wherein:
   each said conveyor is provided with a receiver; and
   a response signal forming a coded pulse telegram being transmitted from said transmitter of the transponder to said receiver of said conveyor.

6. The apparatus as defined in claim 5, wherein:
   said transmitter comprises an opto-electronic transmitter transmitting said coded pulse telegram.

7. The apparatus as defined in claim 6, wherein:
   said opto-electric transmitter is structured to transmit infrared radiation forming said coded pulse telegram.

8. The apparatus as defined in claim 4, further including:
   a number of group control units;
   two-wire line means for operatively connecting each group control unit to a predetermined group of a selected number of said transponders and to said central system control;
   said output amplifier includes a strobe input; and
   said strobe input of said output amplifier initiating transmission of said interrogation signal received by said receiving antenna of said transponder as an unmodulated induction signal to an associated one of said group control units and to said central system control as a presence indication signal indicating the presence of a respective one of said conveyors and for determining the position thereof.

9. The apparatus as defined in claim 3, wherein:
   said receiving antenna of said transponder receiving a data signal by modulated electromagnetic induction from said transmitting antenna of said conveyor located in the operable range of said transponder; and
   said code generator being connected to said receiving antenna of said transponder for receiving said data signal as an interrogation signal.

10. The apparatus as defined in claim 5, further including:
    a transmitting antenna provided at each said conveyor;
    a receiving antenna provided at each said transponder; and
    said transmitting antenna at said conveyor transmitting electrical energy to said receiving antenna at said transponder via modulated or unmodulated electromagnetic induction in order to generate and transmit said response signal.

11. The apparatus as defined in claim 10, further including:
    a transmission path defined between said conveyor and said transponder;
    an interrogation signal being transmitted from said transmitting antenna to said receiving antenna;
    a number of group control units each of which is connected to a group of a selected number of said transponders and to said central system control via two-wire lines;
    said output amplifier including a strobe input;
    said strobe input of said output amplifier effectuating transmission of said interrogation signal to an associated one of said group control units and to said central system control as a presence indication signal for indicating the presence of said conveyor and to determine the position thereof; and
    said interrogation signal, said presence indication signal and said electrical energy being conjointly transmitted via said transmission path by unmodulated electromagnetic induction from said transmitting antenna at said conveyor to said receiving antenna at said transponder.

12. The apparatus as defined in claim 10, further including:
   a transmission path defined between said conveyor and said transponder;
   an interrogation signal being transmitted from said transmitting antenna to said receiving antenna;
   said receiving antenna receiving a data signal from said transmitting antenna; and
   said interrogation signal, said data signal and said electrical energy being conjointly transmitted via said transmission path by modulated electromagnetic induction from said transmitting antenna at said conveyor to said receiving antenna at said transponder.

13. The apparatus as defined in claim 5, wherein:
   said code generator contains said response signal stored therein; and
   said response signal being constituted by a location code identifying said travel path section with which said transponder is operatively associated.

14. The apparatus as defined in claim 1, wherein:
   said code generator storing at least one response signal comprising identifying signals for identifying individual ones of said conveyors.

15. The apparatus as defined in claim 9, wherein:
   at least one of said data signals which is transmitted between said conveyor and said central system control comprises an identifying signal for identifying individual ones of said conveyors.

16. The apparatus as defined in claim 1, further including:
   a control line controlling said multiplexer; and
   said control line defining a current supply for said transponder for bidirectional transmission of data signals.

17. The apparatus as defined in claim 3, wherein:
   the modulated electromagnetic induction transmitted from said transmitting antenna at said conveyor to said receiving antenna at said transponder is modulated by frequency-shift keying.

18. The apparatus as defined in claim 1, wherein:
   said transponder in said second operational state in which said transponder operates as a bidirectional transmitter between one of said conveyors and said central system control, transmitting data signals coded in Manchester code from said central system control to said one conveyor.

19. The apparatus as defined in claim 2, wherein:
   each said group control unit being operatively associated with a predetermined number of said travel path sections via a respective of said transponders; and
   each said travel path section being freely selectable to operate in one of a number of different operational modes constituting a standard mode and an inspection mode for diagnosis and error detection.

20. The apparatus as defined in claim 1, further including:
   diversity means for protecting signal transmission between said central system control and individual ones of said conveyors against malfunction and falsification; and
   parity means for ensuring error detection.

21. An apparatus for controlling and for signal transmission in conveyor installations containing a number of conveyors movable along a predetermined path of travel comprising a number of travel path sections, comprising:
   a central system control;
   a stationary transmitting and receiving installation positioned to cooperate with said conveyors and operatively connected with said central system control;
   said stationary transmitting and receiving installation comprising at least one transponder operatively associated with at least one of said travel path sections;
   said transponder being in wireless communication with a conveyor when the same is located within an operable range of said transponder and being operatively connected with said central system control;
   a multiplexer operatively associated with said transponder;
   said transponder being selectively switchable by said multiplexer into either (i) a first operational state in which said transponder simultaneously operates as a responder when interrogated by one of said conveyors present within the operable range thereof and as a transmitter for signal transmission to said central system control and (ii) a second operational state in which said transponder operates as a bidirectional transmitter between said one conveyor and said central system control;
   said transponder, for operation in said first operational state, comprising at least one code generator, a current amplifier and a transmitter for transmitting a response signal stored in said code generator; and
   said transponder, for operation in said second operational state, comprising a demodulator, an output amplifier and an input amplifier.

* * * * *